Patented Oct. 10, 1950

2,524,787

UNITED STATES PATENT OFFICE 2,524,787

PREPARATION OF ETHINYL-TETRALOLS

Moses Wolf Goldberg, Upper Montclair, and William Edwin Scott, Essex Fells, N. J., assignors to Hoffmann-La Roche Inc., Nutley, N. J., a corporation of New Jersey No Drawing. Application December 22, 1948, Serial No. 66,852

3 Claims. (Cl. 260—611)

The present invention relates to the synthesis of 1-ethinyl-6-lower alkoxy-1-tetralols which can be represented by the following formula:

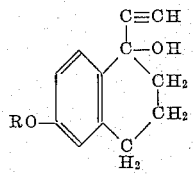

wherein R stands for a lower alkyl group, such as for example, methyl, ethyl, or the like. The compound where R stands for methyl, has already been described in the literature, whereas the compound where R is ethyl, to the best of our knowledge, is new.

The heretofore described methods for the preparation of the known 1-ethinyl-6-methoxy-1-tetralol are accompanied by many drawbacks, such as low yields, impurities and confinement to small scale operations. According to one of the known methods, 6-methoxy-1-tetralone is condensed with acetylene magnesium bromide in the presence of an excess of acetylene under pressure. From the reaction mixture 1-ethinyl-6-methoxy-1-tetralol is recoverable in very low yield. Furthermore, it is very difficult to carry out the process in batches of more than a few grams.

According to another procedure, 6-methoxy-1-tetralone is condensed at 40° C. with sodium acetylide in dioxane saturated with acetylene. The reaction mixture obtained contains a large proportion of starting material, which is separated, following a preliminary distillation, by means of its phenylhydrazone. A second distillation is necessary for further purification of the 1-ethinyl-6-methoxy-1-tetralol, which is obtained in a yield of not more than 35 per cent.

By the previously described procedures, the 1-ethinyl-6-methoxy-1-tetralol is obtained in an impure state, and only as an oil.

According to our invention, we have found that 1-ethinyl-6-lower alkoxy-1-tetralols can be readily prepared in high yields and high purity by condensing 6-lower alkoxy-1-tetralones with lithium acetylide in liquid ammonia in the presence of free acetylene, preferably at room temperature. With the new process yields of over 80 per cent of 1-ethinyl-6-methoxy-1-tetralol, and of 1-ethinyl-6-ethoxy-1-tetralol, are readily obtainable. The process results in compounds of such purity that they readily crystallize, whereas by the prior procedures, as already stated, the 1-ethinyl-6-methoxy-1-tetralol was obtained only as an oil.

In general, the temperature of the reaction may vary from about 15–45° C. At lower or higher temperatures, smaller yields of the ethinyl-tetralols are obtained. Attempts to employ sodium acetylide in place of lithium acetylide in the new process result in the formation of large quantities of tar, with a yield of only about 10 per cent of the ethinyl-tetralols.

The following examples will serve to illustrate the invention:

Example 1

35 grams of 6-methoxy-1-tetralone, 7.65 grams of lithium acetylide, and 230 cc. of liquid ammonia were placed in a glass liner for a shaking autoclave. Dry acetylene was passed into the mixture until the volume had increased by 20 cc. The mixture was then placed in the autoclave, and, with shaking, allowed to come to room temperature. After shaking 20 hours at room temperature, the autoclave was vented until the pressure dropped, and the liner was then removed. The dark red product was washed from the liner with anhydrous ether.

To the ether-ammonia solution were added slowly 20 grams of ammonium chloride, and the ammonia was distilled off. The residue was treated with ice and water. The ether layer was separated, washed with water, and dried with anhydrous sodium sulfate. After removal of the ether, the residue was distilled in a vacuum of 0.1 mm. 35 grams of viscous material distilled at 120–131° C. The product was then dissolved in hot ligroin. On cooling an oil separated which readily crystallized. The 1-ethinyl-6-methoxy-1-tetralol thus obtained had an M. P. 89° C.

Example 2

100 grams of 6-ethoxy-tetralone, 32 grams of lithium acetylide, 1000 cc. of liquid ammonia and acetylene were reacted at room temperature in an autoclave for 20 hours as in Example 1, and the reaction product worked up in the same manner as described in Example 1. The product was then distilled at 0.1 mm., and the following fractions taken:

|   | Boiling point, ° C. | Grams |
|---|---|---|
| 1 | Up to 120 | 0.64 |
| 2 | 120–122 | 1.65 |
| 3 | 122–130 | 100.00 |

Fraction 3 was crystallized from benzol-ligroin, and the crystals of 1-ethinyl-6-ethoxy-1-tetralol melted at 75° C. The yield was 87 per cent.

The 1-ethinyl-6-lower alkoxy-1-tetralols are useful in the synthesis of steroids.

We claim:

1. A process of preparing 1-ethinyl-6-lower alkoxy-1-tetralol which comprises reacting 6-lower alkoxy-1-tetralone with lithium acetylide in liquid ammonia in the presence of free acetylene at a temperature between about 15° and about 45° C.

2. A process according to claim 1 in which the 6-lower alkoxy-1-tetralone is 6-methoxy-1-tetralone.

3. A process according to claim 1 in which the 6-lower alkoxy-1-tetralone is 6-ethoxy-1-tetralone.

MOSES WOLF GOLDBERG.
WILLIAM EDWIN SCOTT.

REFERENCES CITED

The following references are of record in the file of this patent:

OTHER REFERENCES

Goldberg: "Helvetia Chim. Acta," vol. 23 (1940) pages 836–837.

Dane et al.: "Annalen," vol. 532 (1937) pages 39–51.

Birch: "Jour. Chem. Soc.," London (1944) pages 503–6.

Johnson: "Acetylenic Compounds," vol. I, page 13 (1946), publisher, Arnold & Co., London.